C. H. ATKINS.
INTERNAL COMBUSTION MOTOR.
APPLICATION FILED JUNE 7, 1905.
925,793.
Patented June 22, 1909.
9 SHEETS—SHEET 9.
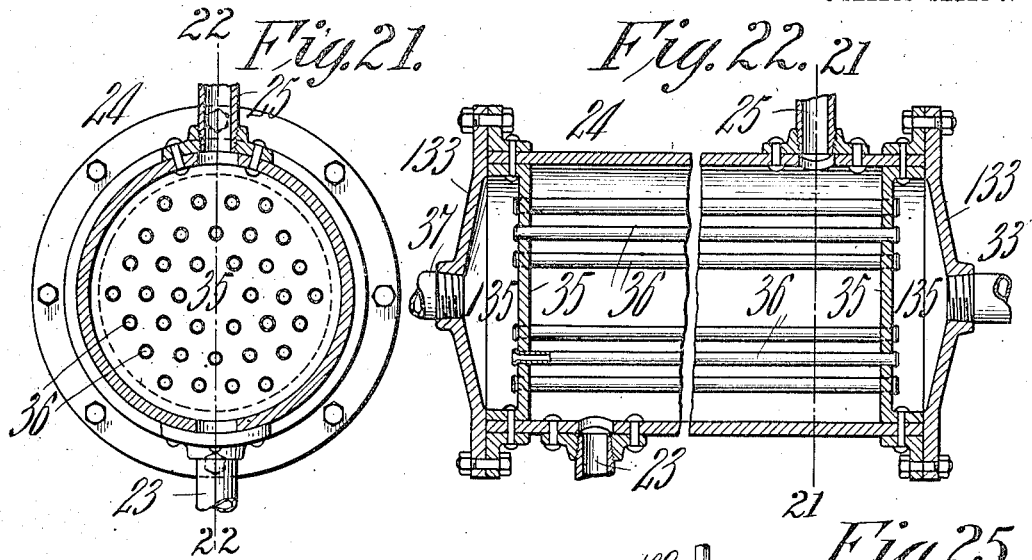
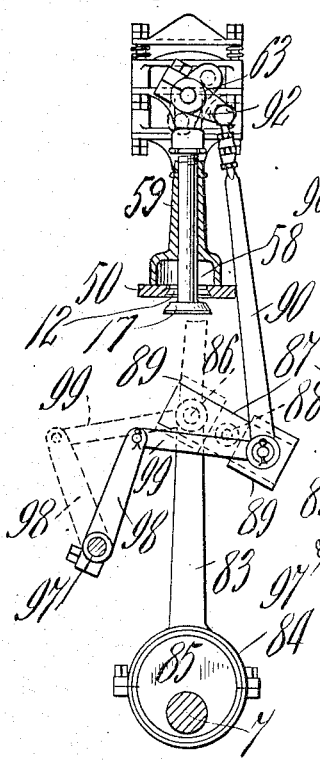
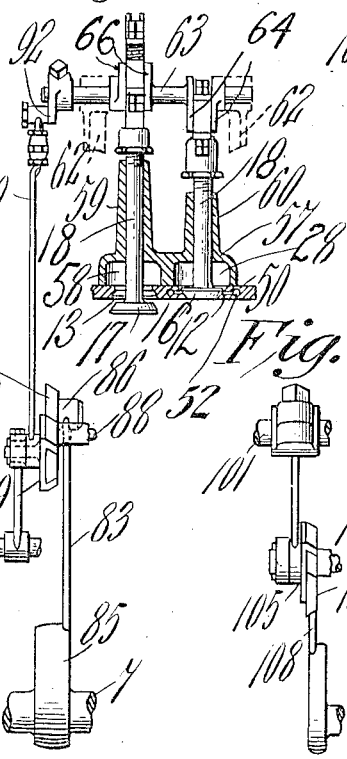
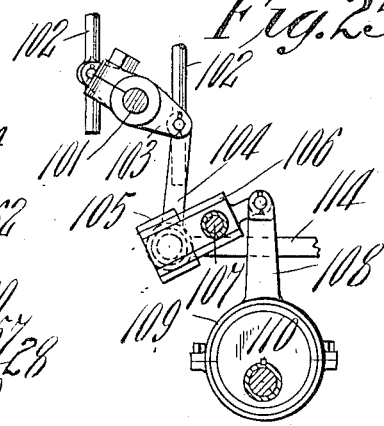
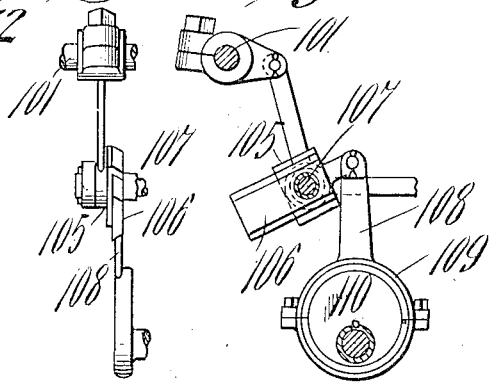
Witnesses:
H. L. Sprague
J. V. Garfield
Inventor:
Charles Henry Atkins
by Wm. J. Belleus
Attorney.

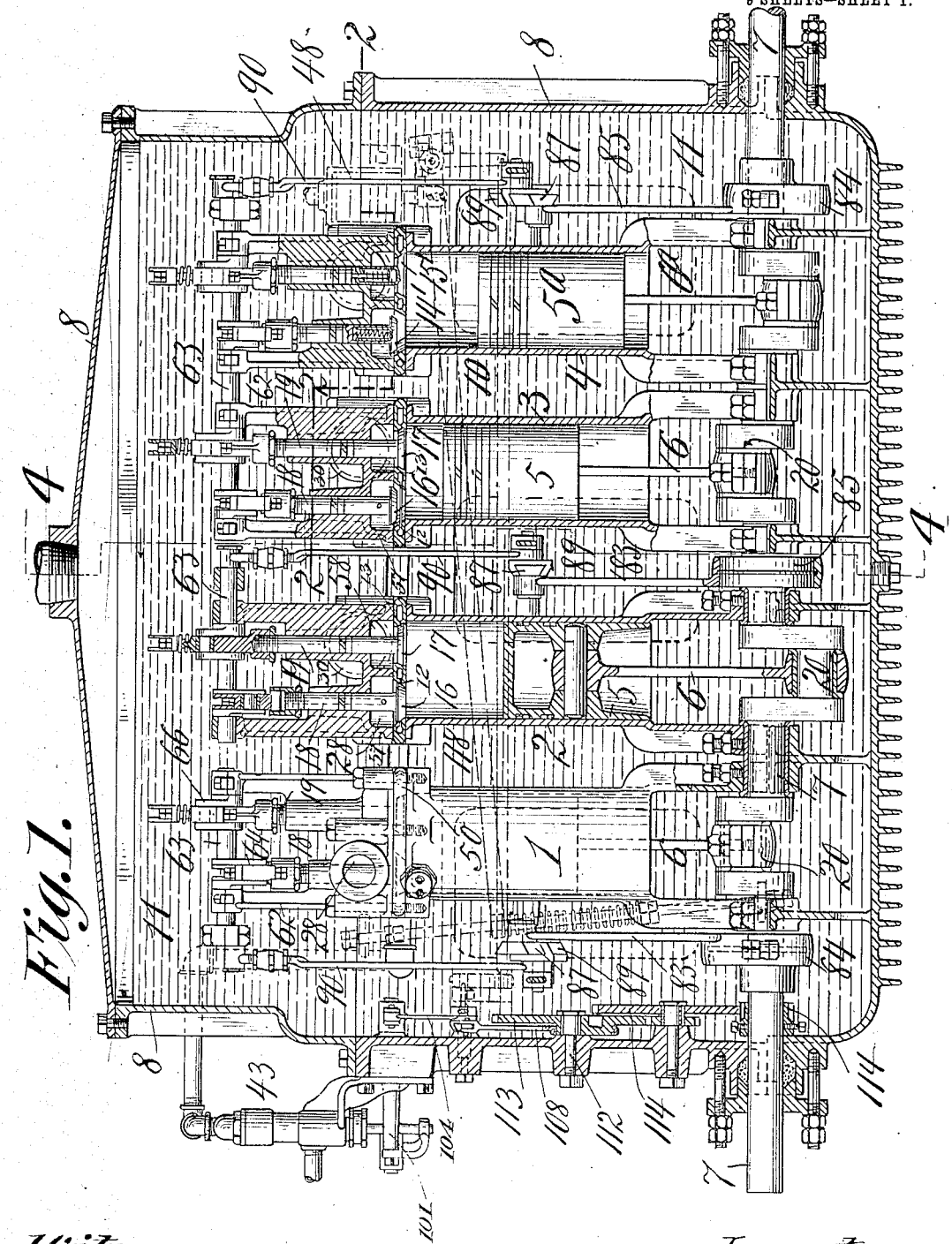

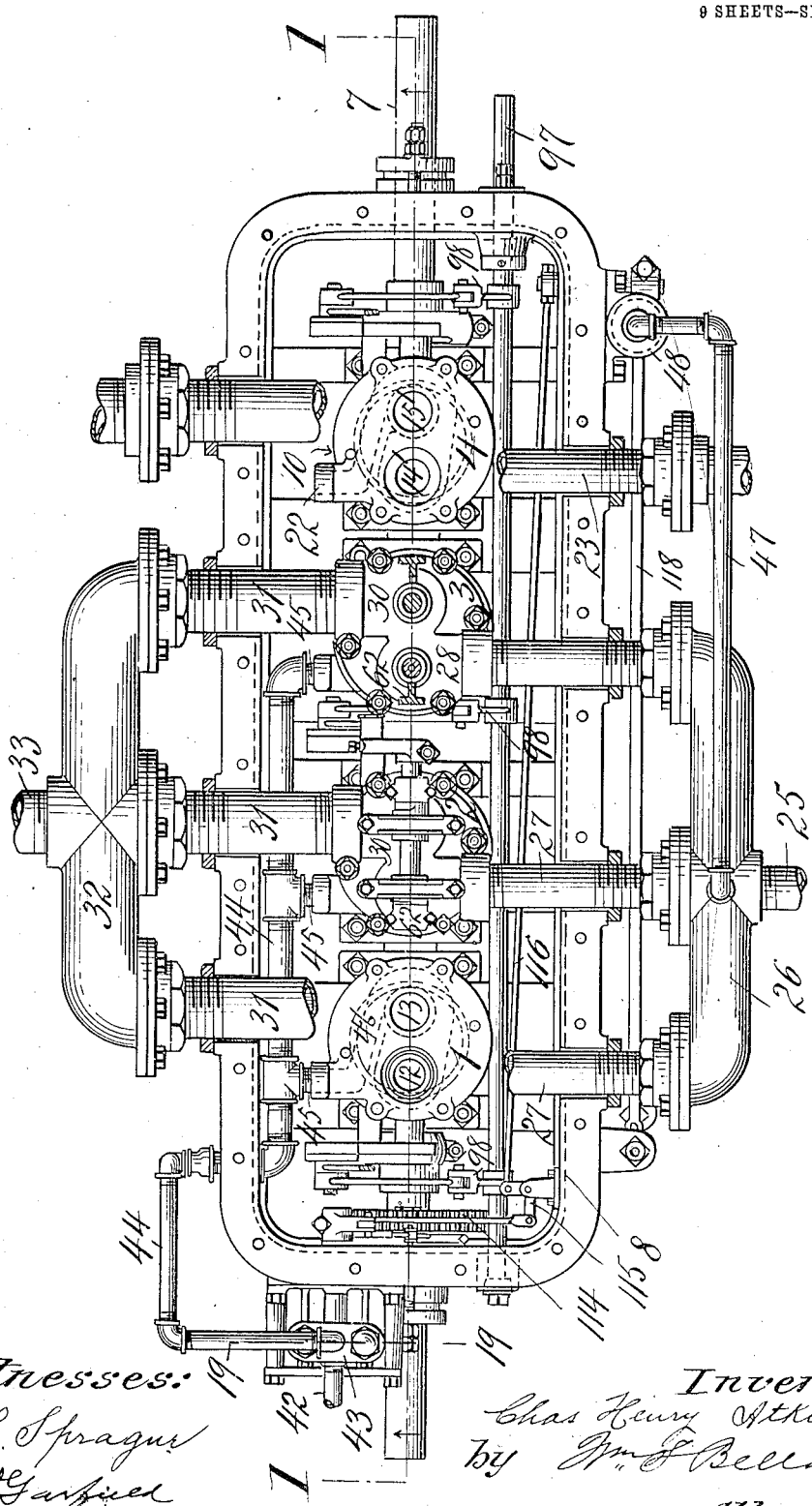

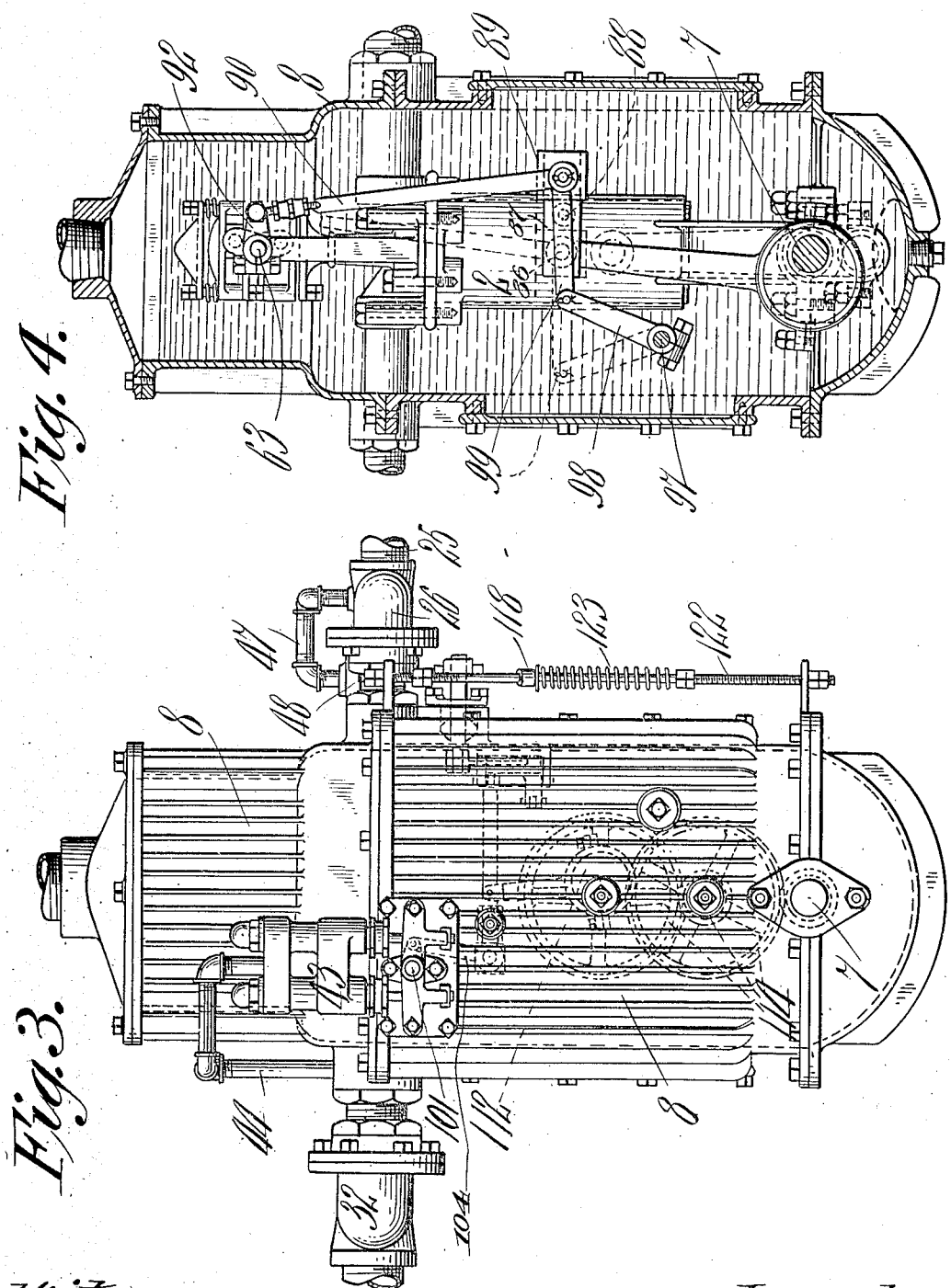

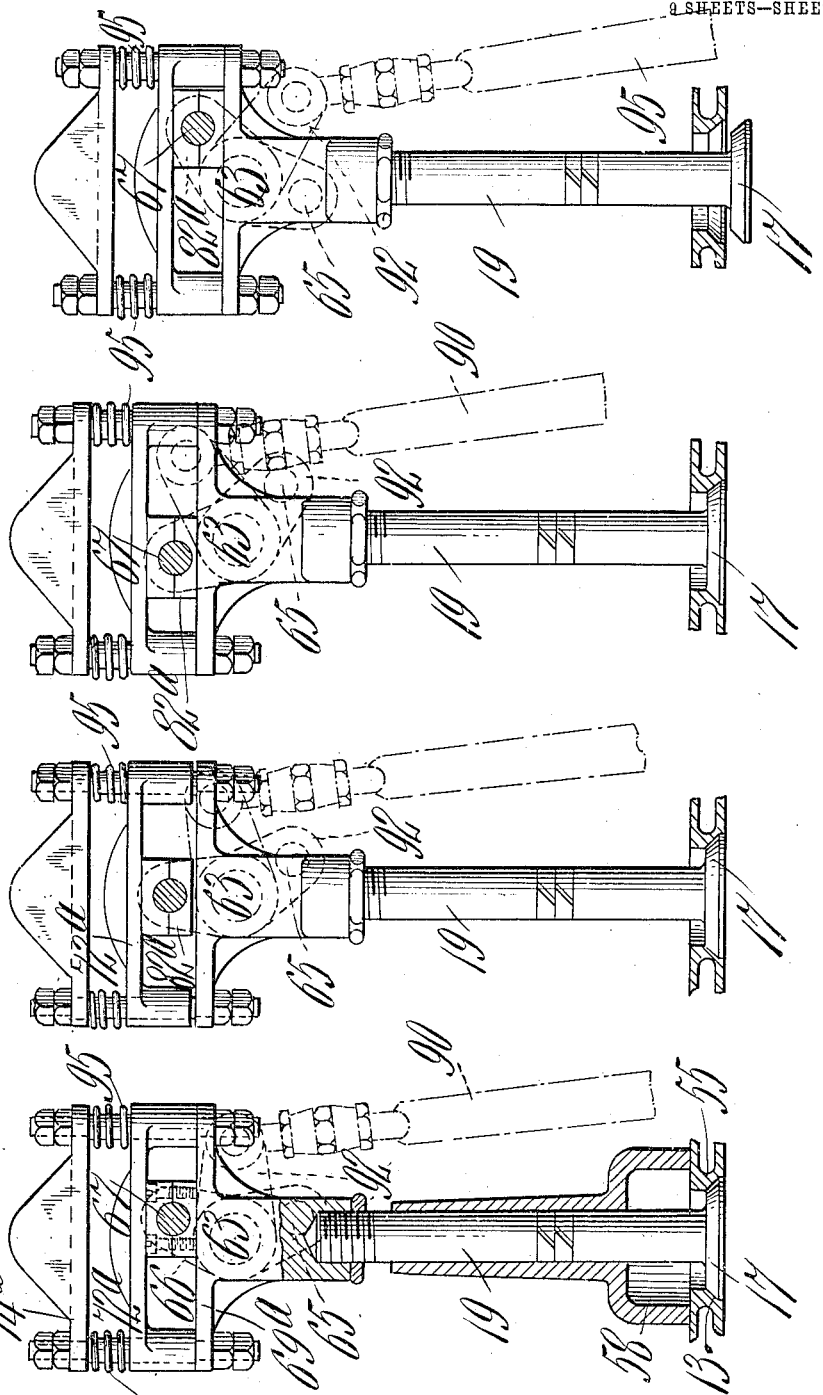

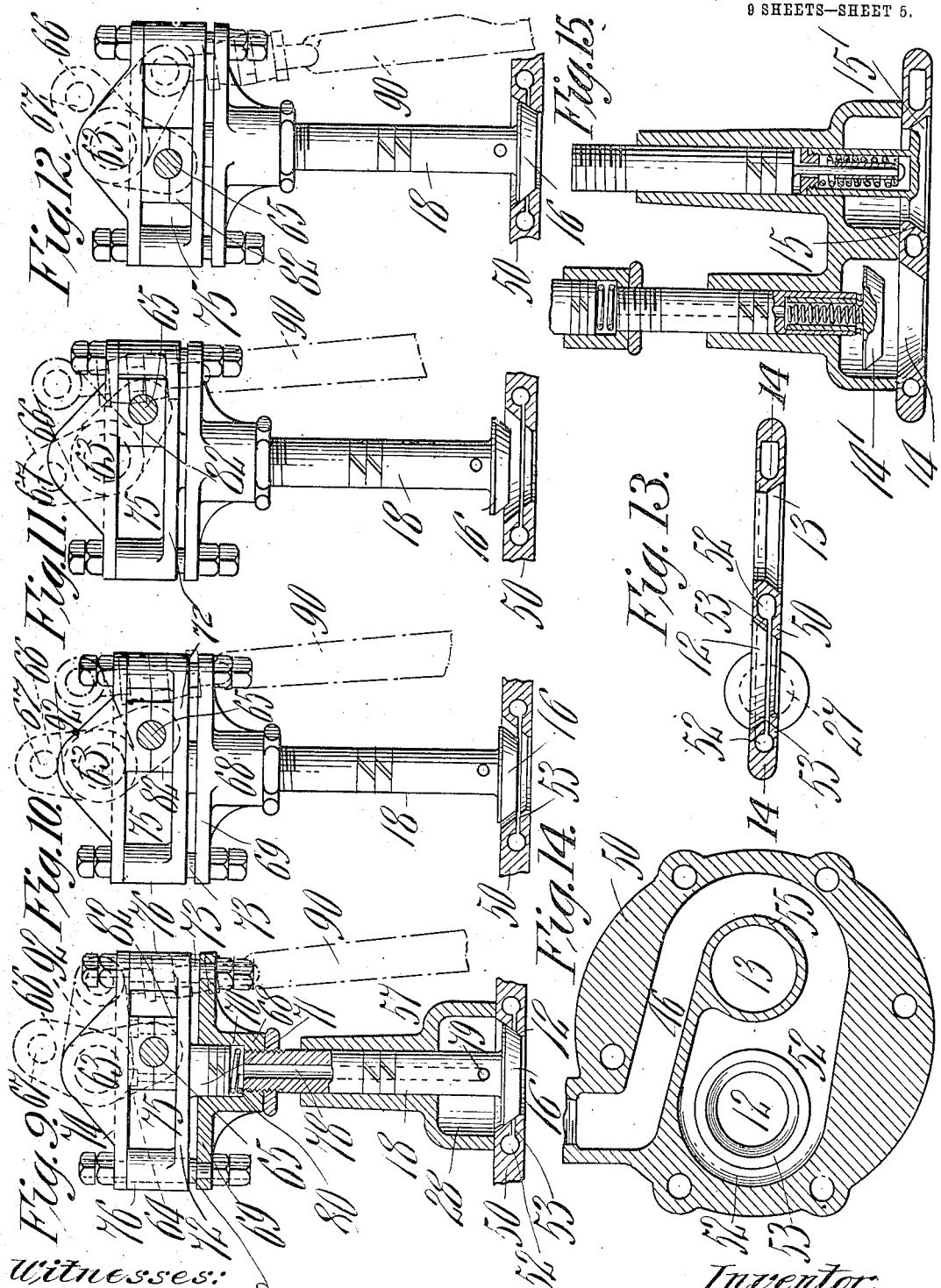

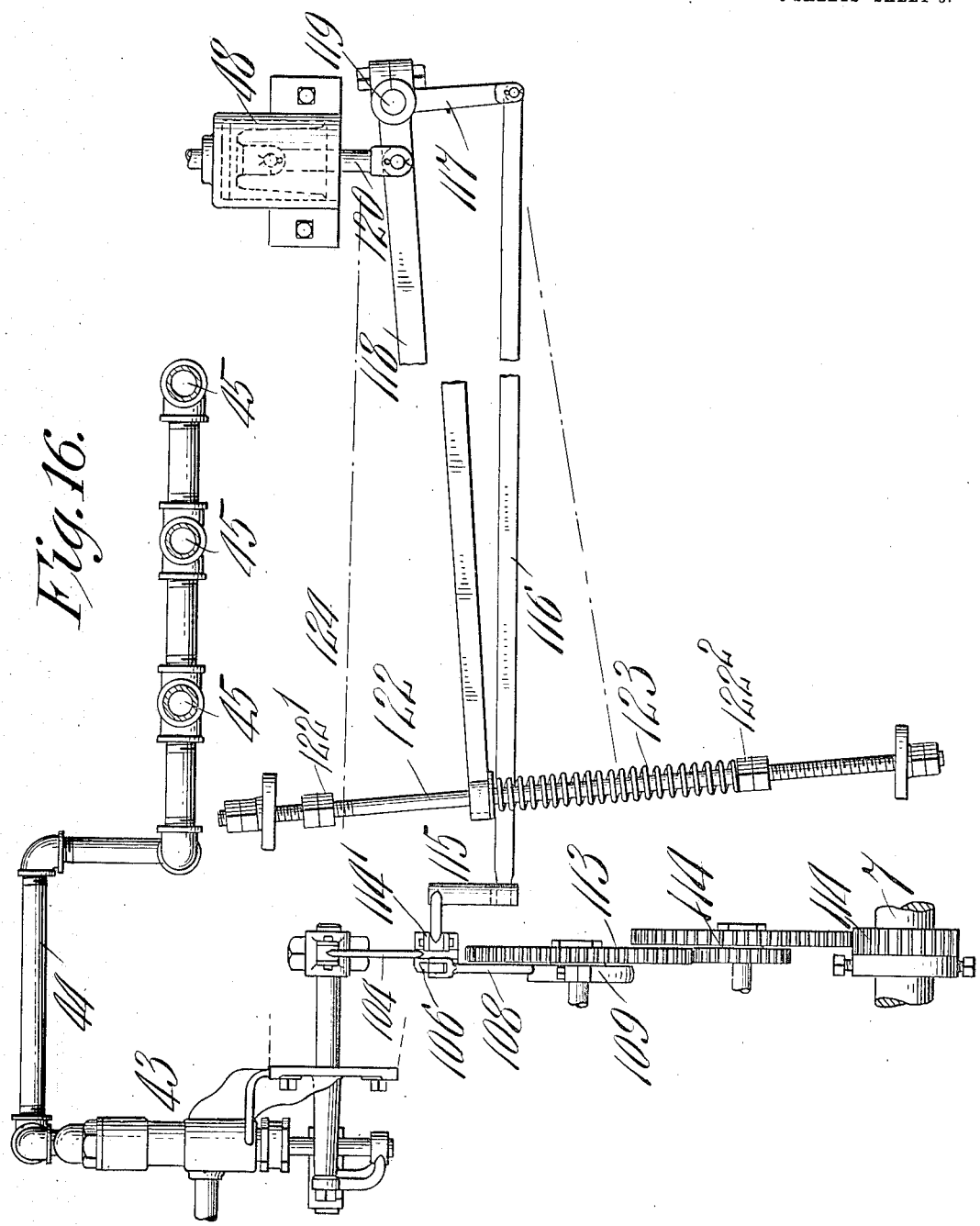

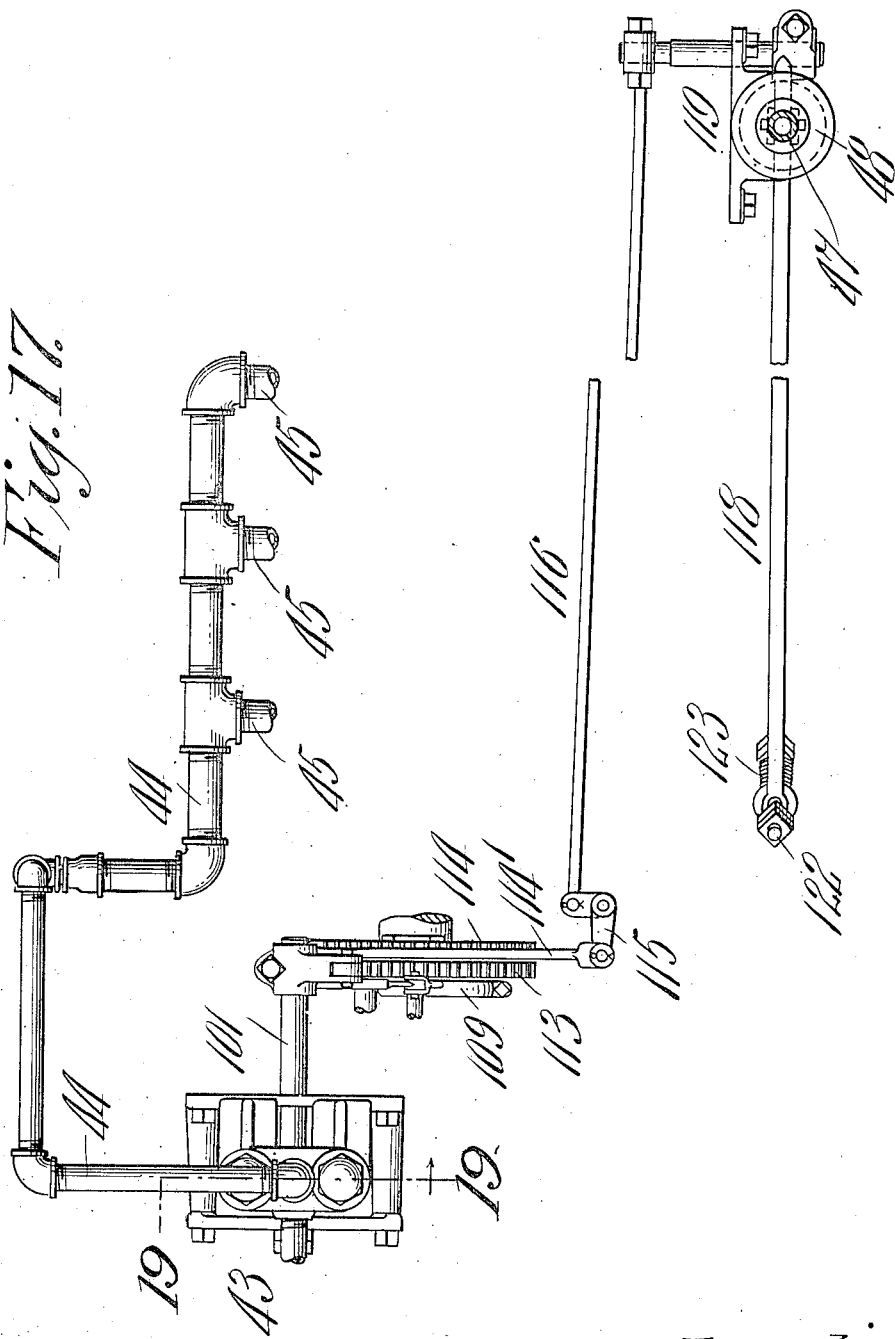

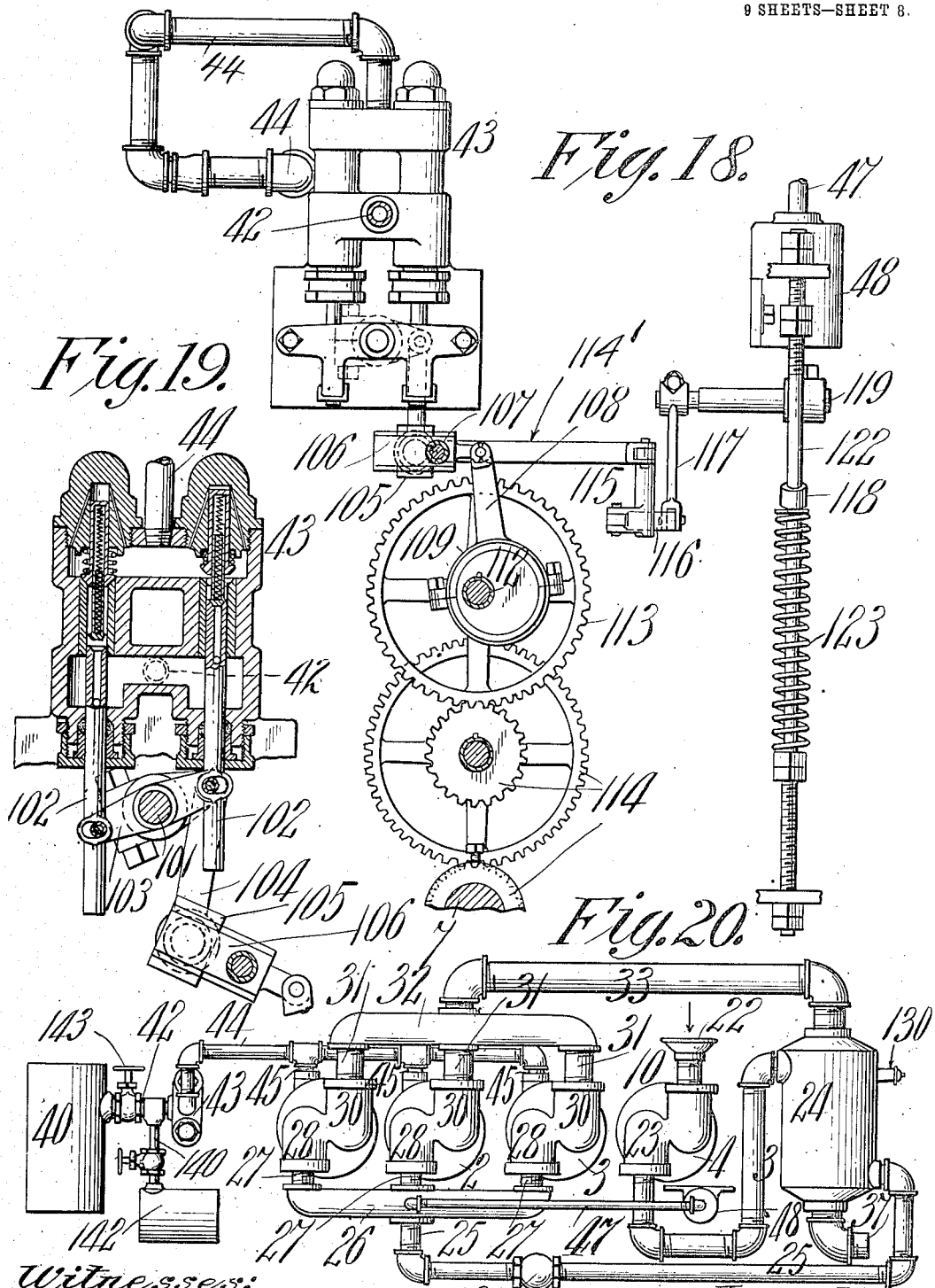

UNITED STATES PATENT OFFICE.

CHARLES HENRY ATKINS, OF SPRINGFIELD, MASSACHUSETTS.

INTERNAL-COMBUSTION MOTOR.

No. 925,793.  Specification of Letters Patent.  Patented June 22, 1909.

Application filed June 7, 1905. Serial No. 264,190.

*To all whom it may concern:*

Be it known that I, CHARLES HENRY ATKINS, a citizen of the United States of America, and resident of Springfield, in the county of Hampden and State of Massachusetts, have invented certain new and useful Improvements in Internal-Combustion Motors, of which the following is a full, clear, and exact description.

This invention relates to improvements in engines or motors of the internal combustion class, and includes in combination with one, but preferably a plurality of working cylinders, an air compressing machine or pump for supplying air under suitably high compression to commingle with the liquid fuel in delivery into the respective working cylinders.

An object of the invention is to produce a motor which renders it practicable to use petroleum or like hydrocarbon as the motive power producing agent, the fuel or gas in combustion within the motor cylinders being continuous and operating for comparatively long periods in each reciprocation of the piston at constant pressure but with variable volume,—the action being in this respect unlike that of the more common types of explosive gas motors.

An object, furthermore, is to provide in conjunction with the valve operating mechanism of the cylinders, reversing mechanism, through the instrumentality of which the main shaft of the motor may have, at pleasure, the rotation thereof instantly reversed.

Another object of the invention is to provide auxiliary means whereby gasolene or like highly volatile and combustible fluid may be initially utilized for starting the motor, such use to be discontinued thereafter permitting to be brought into employment the means for supplying petroleum or other hydrocarbon into the working cylinders as the motive power agent.

Another object is to render useful,—instead of detrimental,—the heat developed by and radiated from the cylinders, by subjecting, to such developed and radiated heat, the liquid fuel before the latter is supplied into the working cylinders, thereby considerably increasing the efficiency of the motor.

Another object is to provide a heater in and through which is received and passed the exhaust products of combustion from the working cylinder, and through which heater the compressed air passes in its course from the air compressing cylinder to the working cylinders, whereby such compressed air is heated to a high degree, greatly increasing the efficiency of the motor, which, in addition to having the nature of an internal combustion motor, partakes of the nature of a hot air engine. And the heater last referred to is so constructed as to serve the further function of a muffler for the motor.

Another object is to provide automatic controlling or regulating mechanism whereby the quantity of liquid fuel, which will be positively pumped through the respective working cylinders for admixture with compressed air, for combustion therein, will always be properly proportionate, as may be predetermined, to the quantity, as indicated by the pressure, of the compressed air introduced into the working cylinders. And other objects are generally to organize the motor and construct the components thereof in a comparatively simple manner, permitting to be used, to a considerable extent duplicated portions of the apparatus with a view to economy in cost of construction. And to these ends the invention consists in the coöperative combination and arrangement of mechanisms and appliances and the particular construction of devices or mechanisms and parts of the same all substantially as hereinafter fully described and set forth in the claims.

In the drawings,—Figure 1 is a longitudinal vertical section through the engine and its casing. Fig. 2 is a plan view of the engine with the upper part of the inclosing casing therefor removed, and in this view certain portions are represented in horizontal cross section as taken on the line 2—2, Fig. 1,—the valve supporting parts for the opposite end cylinders in this view being understood as removed. Line 1—1, on Fig. 2 represents the vertical plane of section for Fig. 1. Fig. 3 is a left end elevation of the engine. Fig. 4 is a vertical cross sectional view as taken on the line 4—4, Fig. 1. Figs. 5 to 8 inclusive are elevations of parts in section, showing the successive movements and corresponding positions of the exhaust valve operating connections; and Figs. 9 to 12 inclusive are similar views in illustration of the corresponding movements and positions of the inlet or admission valve operating connections. Figs. 5 and 9 represent the positions occupied by the respective parts represented therein at a given time. Figs. 6 and 10, 7 and 11, 8 and 12, likewise represent respectively corresponding simultaneous positions of the parts. Fig. 13 is a vertical section view of the valve seat plate for one of the internal combustion cylinders. Fig. 14 is a horizontal sectional view of the same as taken on the line 14—14, Fig. 13. Fig. 15 is a vertical sectional view through the valve seat plate and cylinder head for the air compressing cylinder, showing the inlet and outlet valves thereat. Fig. 16 is a side elevation showing the liquid fuel pump, as separated from the engine in conjunction with which it is used, together with its driving mechanism and with appliances coacting therewith and with the air supplying means for controlling the pumping efficiency of said liquid fuel pump. Fig. 17 is a plan view of the same. Fig. 18 is an elevation of the same as seen endwise as related to the engine, and at right angles to Fig. 16. Fig. 19 is an enlarged vertical sectional view, through the liquid fuel pump, as taken on the section lines 19—19, shown on both Figs. 2 and 17,—the positions of portions of the pump driving connections shown being in different positions from those seen in Figs. 3 and 18. Fig. 20 is a diagrammatic plan showing the system in which the leading components of this invention are included. Figs. 21 and 22 are respectively transverse and longitudinal sectional views through an appliance which serves the function of a heater for the compressed air employed in the engine, and also of a muffler for the discharged products of combustion (which latter constitute the heating agent),—line 21—21 on Fig. 22 showing the section on which Fig. 21 is taken, and line 22—22, on Fig. 21 showing the plane on which Fig. 22 is taken. Figs. 23 and 24 show sectional elevations as projected one from another, and as seen at right angles to each other, of the operating mechanism for the inlet and exhaust valves, Fig. 24 showing the parts as seen from the side opposite from Fig. 1. Fig. 25 is an end elevation showing portions of the liquid-fuel pump-operating mechanism more or less as represented in Fig. 19, and showing relations of the parts for acquiring extreme strokes of the pumping plungers, and Figs. 26 and 27 are elevations at right angles to each other, showing the other extreme (for non pumping) in the positions of the operation governing parts of the last named mechanism.

Similar characters of reference indicate corresponding parts in all of the views.

The general organization of the engine, in its preferable form, will be briefly stated as follows: A plurality of internal combustion, motive power or "working" cylinders 1, 2, and 3, are arranged in a row axially parallel and having alongside the one 3, a cylinder 4 comprised in an air compressor 10; and below all of the cylinders 1 to 4 is the crank-shaft or "engine-shaft" 7, with the cranks of which the pistons 6, 6, 6, and 6ᵃ for the pistons 5, 5, 5, and 5ᵃ of the respective cylinders 1 to 4 are connected. Each of the three working cylinders 1, 2 and 3, has in its upper end head or closing wall an oil fuel and an air entrance opening 12, and an exhaust opening 13,—the air compressor cylinder having in its valve plate or head an air admission opening 14 and a compressed air discharge opening, with valves 14' and 15' therefor; and there are three outwardly opening inlet valves 16 for the respective inwardly flaring valve seat inlet openings of the working cylinders and three valves 17 endwise inwardly opening for the cylinder exhaust openings 13. The valve stems 18 for the three inlet valves are extended endwise beyond the upper end of the cylinders 1, 2, and 3, in parallelism with each other and with the stems 19 of the valve 17 for the exhaust openings; and positive valve operating means are provided for the operation of the inlet valves and the outlet valves in proper time as to the individual ones of each set relatively to the others, and also in proper time as regards the opening and closing periods of the inlet valves relatively to the exhaust valves for the respectively corresponding cylinders; and the air compressor embodies, in its construction, parts and arrangements very similar to those included in and appurtenant to the working cylinders.

All of the four cylinders aforementioned, the crank shaft, piston connections and valve mechanisms provided in conjunction with the several cylinders are inclosed in the casing 8 in which a body of oil represented at 11 is contained, sufficient to entirely submerge the apparatus, said casing serving to firmly support as well as inclose the motor mechanism. The cranks 20 of the engine shaft are understood as set at "thirds" when the engine, as preferably designed, comprises three cylinders and respective pistons and piston rods or pitmans.

The motor as here especially illustrated (although not necessarily), comprises the air compressor which is included as an essential apparatus forming part of the motor; and it will be here stated that no particular construction or type of air compressor is necessarily employed, it being only here pointed out that 22, Figs. 2 and 20, indicates the air inlet passage leading into the compressor cylinder, and 23 indicates a conduit for the discharge of the compressed air, said conduit being connected into a chambered heater 24 shown in the diagram 20 and in section in Figs. 21 and 22. A conduit 25 leads from the heating chamber in the appliance 24 to a distributing chamber 26, from which latter the branch pipes 27, 27, 27, lead to connection with passages or chambers 28, which are in communication (when the inlet valves are open) with the cylinder inlets 12. From chambers or passages 30, 30, 30, in communication (when the exhaust valves are open) with the openings of the three cylinders, the pipes or conduits 31, 31, 31, lead to connection with the receiving chamber 32 for the products of combustion exhausting from the cylinders; and from this receiving chamber 32, a conduit 33 leads to connection with the drum or heater 24, subjecting the compressed air in passage therethrough from the air compressor to the inlets of the working cylinders to the very considerable temperature raising action thereof, it being understood that the chambers or passages within this heater 24 respectively for the compressed air and the exhausting products of combustion in passage therethrough are separated by suitable walls 35 and flues 36, so that the air and heated exhaust or dead gases will not come into mixing contact.

37 indicates an outlet opening or conduit for the discharge from the heater 24 (which is also a muffler), at now very slight pressure, of the exhaust dead gas.

40 represents a receptacle for a liquid fuel supply which may be petroleum or analogous hydrocarbon of low volatilization, connected with the delivery conduit 42, with which a small oil pump 43, driven constantly through connections with the engine shaft, and having the discharge or delivery pipe 44 by way of the coupling connected branches 45, 45, 45, is in communication with the tortuous passages 46 formed within the valve plates or upper end walls of the cylinders, and which have communications with the cylinder inlet openings 12. A portion of the conduit 44, which is located in proximity to the coupled branch pipes 45 and in intimate relation to the several cylinders, is within the engine-inclosing, and heavy oil-containing, casing, so that the heat absorbed from the radiation of the cylinders becomes effective to raise the temperature of the oil being pumped to the cylinders for combustion and the creation of motive power pressure therein. While so far as the oil pump 43 is concerned, whatever novelty in its specific construction may exist, it is not to be considered as a part of this invention or to be set forth in this patent, but an oil pump, of which the one shown is a satisfactory exemplification, is to be considered coöperatively combined as a part of this new motor, the arrangement of driving connections between it and the engine shaft being new and appurtenant to the motor organization; and there is also included in such organization, a regulating or controlling mechanism operated by a diaphragm subject by the connection of air pipe 47 between the receiving chamber 26 and the diaphragm or piston inclosing casing 48 to the pressure of air developed by the air compressor 10 and operative to vary the working efficiency of the oil-pump in consequence of, and in accordance with, the working efficiency of the air-compressor, whereby oil for combustion introduced into the cylinders is quantitively proportionate to the pressure and quantity of the compressed air also delivered into the cylinders in conjunction with such oil.

The valve operating mechanism for each one of the working cylinders is constructed and arranged or timed so that the inlet and exhaust valves for the given cylinder will have their alternating openings and closings in each cycle of engine operation for ingress of the oil through the valve-opened inlet-opening 12 for approximately one-half of the cycle or complete rotation of the engine shaft,—the exhaust opening being closed for the entire time that the inlet is opened, but becoming open, while the piston in the cylinder is having its return or upward stroke, for the discharge of the dead gas or then non-effective products of combustion. And by reference to Figs. 5 to 12 inclusive, relative positions of the inlet and exhaust valves, for a time including the whole period of liquid fuel intake are represented,—Figs. 5 and 9 showing both valves in their positions (both closed) in a midway instant in the cycle; Figs. 10 and 11 show the inlet valve partially and fully opened,—Figs. 6 and 7 showing the respective relative synchronized positions (still closed) of the exhaust valve. Now, while Fig. 12 shows the inlet valve returned to its closed position, which it assumes when the piston for the given cylinder has been forced to its downward position and is at the end of its working stroke, the exhaust valve, as shown in Fig. 8, is now seen to be fully open; and during the latter one-half of the cycle, the exhaust valve will remain open while the inlet valve will remain closed.

I will now describe the valve mechanism and cylinder head constructions in detail.

The upper end of each working cylinder, 1, 2, and 3, is constructed with what is herein termed a "valve plate" 50, through which, side by side, are formed the circular inlet and exhaust openings 12 and 13, the former being upwardly outwardly flaring, while the exhaust opening is flaring downwardly and inwardly relatively to the cylinder chamber. The cylinder valve plate 50 is cored out within its thickness whereby the flat annular chamber 52 is produced, surrounding the inlet opening 12, such flat annular chamber communicating with the opening 12 through the flat annular slit or passage 53, and the passage 46 at the outer end of which the oil supply branch pipe 45 connects has a devious course from the edge portion of the cylinder plate to its connection with the flat annular chamber 52, as represented in Fig. 14, whereby the incoming oil has a course encircling the wall 55 surrounding the exhaust opening and reaches the annular chamber 52 in a direction best calculated to establish a circular distribution of the oil in said chamber 52, where it will thence pass through the annular slit 53 to commingle with the compressed air, which will also pass therewith into the cylinder.

The valve plate has superimposed thereon, and bolted thereto and to the cylinder proper a cylinder head 57, which comprises therein the separate chambers, 28 for compressed air induction, and 58 for the egress of the exhaust. One of the aforementioned air feed pipes 27 communicates with the receiver or air distributing chamber 26, connecting into the chamber 28, while from the chamber 58 one of the pipes 31 leads to carry the products of combustion ultimately to and through the heater and muffler 24. The cylinder head 57 has the casings thereof, which inclose the chambers 28 and 58, constructed with the upwardly extending, parallel, centrally bored guides 59 and 60 for the stems 18 and 19 of the inlet and exhaust valves, which stems at their upper ends have cross heads of peculiar construction, somewhat different specifically as regards the stems of the inlet and exhaust valves respectively, which have their opening movements in opposite directions,—it being noticed that the inlet valves open upwardly and outwardly while the exhaust valves open downwardly and inwardly. Each cylinder head has cast as parts thereof, or bolted thereto, a pair of oppositely located standards 62, 62, having journal bearings for a rock shaft 63 appurtenant to the given cylinder and comprised in the operating mechanism for the inlet and exhaust valves of such cylinder. Said rockshaft 63 has downwardly extending crank members 64 with intermediate cranks or wrist pins 65, operatively engaged with the cross head of the inlet valve, and said rockshaft likewise has upwardly extending, paired crank members 66, united by the intermediate crank or wrist pin 67, operably engaged with the cross head provided to the stem of the exhaust valve. The stem of the inlet valve, as shown in Fig. 9, is externally screw threaded at its upper extremity, receiving screw engagement therewith of the depending hub portion 68 of the cross member 69, which is rigidly carried as a part thereof. Said hub member 68 is centrally circularly socketed, as seen at 70, extending part-way to the bottom of which is a cylindrical boss or hub 71, formed as a part of the horizontal movable member 72 of the yoke comprised as a part of the cross head.

Studs or posts 73, 73, set and affixed in the opposite ends of the horizontal cross member 69, and vertically extending, sustain, in suitable separation thereabove and above the movable cross member 72, the transverse horizontal cross member 74, between the under side of which, and the top side of the movable member 72, is an aperture or slideway 75, the lower boundary of which, as manifest, is movable,—the vertically bored upstanding end hubs of the member 72 having limiting abutments against the under side of the part 74.

The valve stem has an axial passage 78 leading from its upper end downwardly to a point near the junction of the stem with the valve, and terminating in a sidewise opening port 79, which at all times is in communication with the air chamber 28. The light spring 80, interposed between the upper end of the valve stem 18 and the lower end of the boss 71, projecting downwardly from the cross head 72, is a preferable provision: The air in compression is always present during the running of the motor in the chamber 28 through the port 79 and passage 78 and will exert a supporting tendency to maintain the separable member 72 up to its position shown in Fig. 9, but at times when the motor is not running, the part 73 will naturally descend, and hence the spring 80 is regarded as a desirable, though not essential, provision.

The two-part slide-block 82, through which the crank or wrist pin 65 engages, and within which such wrist pin oscillates, has as necessary a sliding motion imparted thereto in conjunction with the motion, in an arc, of the wrist pin 65, and through this slide-block connection, the cross head derives a movement bodily in the line of the axis of the valve stem.

The aforementioned connections for imparting the rocking movement to the rockshaft 63, between such shaft and the engine shaft 7, are as follows: An eccentric rod 83 has the eccentric strap 84 thereof in encircling engagement about the eccentric 85 on the engine shaft; the upper end of the eccentric rod 83 is pivotally connected at 86 with a lever bar 87, which is intermediately pivotally mounted at 88, and has the block 89 thereon (capable of a sliding movement for the motor reversing action to be hereinafter more fully set forth) pivotally connected to which block is the link or connecting rod 90, which is also jointed to the crank arm 92 affixed on the rock shaft 63. See Figs. 23 and 24. When from the thrust of the eccentric on the engine shaft the lever bar is so swung as to upwardly force the connecting rod 90 and rock shaft arm 92, the crank pin 65 will move from the position shown in Fig. 9, corresponding to the closed position of the inlet valve, to the positions shown in Figs. 10 and 11, corresponding to the increasingly opened positions of the inlet valve; and then, as the oscillation of the rock shaft 63 becomes reversed the valve will come to the closed position as shown in Fig. 9, and so remain for about one-half cycle of the motor, and it will be here explained that during the "dwell" or closing period of the inlet valve for the period of a half cycle, and while the rock shaft 63 and crank pin 65 is having the movement from the position indicated in Fig. 9 to the position indicated in Fig. 12, and from the latter position back to the position shown in Fig. 9, the separate member 72 of the cross head yoke has its compensating movement downwardly and relatively to the upper cross head member 74 without affecting the stem of the closed valve or being obstructed by the latter. This "dwell" motion, therefore, is such as to permit the valve to have its upward and opening movement positively imparted thereto by the upward portion of the oscillation of the crank 65 of the rock shaft, and yet permit the reverse oscillation of the crank without obstruction to the movements of the valve operating connections or the imposition of any unduly hard seating pressure against the valve; and in this valve action the separable part 72 of the cross head widens from the part 74 against both the air pressure through the valve stem passage 78 and against the spring 80,—the reactions of the air and spring pressure restoring the part 72 to its normal aperture contracting position. The cross head provided at the upper end of each exhaust valve stem 19 includes the same capability for the positive actuation of the valve from the movement of the rock shaft and crank 67 appurtenant thereto during a portion of the oscillation of the crank 67, and for the dwelling, in closed position, of the valve and its stem during the remainder of the oscillation of the crank 67; but the separable member 72ª in the cross head appliance is arranged for movement upwardly away from the cross member 69ª which is attached to the upper end of the valve stem 19 and toward the upper tie member 74ª, so that it is on the downward arc course of the crank 67 that the valve opening movement is imparted through the slide block 82ª, while the "dwell" of the valve in its closed position is during the swing upward, and through the arc, of the rock shaft crank 67; and the compensating movement in respect of the exhaust valve actuating connections, which the separable member 72ª is permitted to have for the dwell, closed, of the exhaust valve, is against the reaction of the spiral springs 95, which encircle the distance posts between the members 69ª and 74ª, and which are subject to compression between the separate cross head members 72ª and the member 74ª.

In Figs. 9 to 12, the relative positions of the rock shaft crank pins 65 and 67 are shown by full and dotted lines during the inlet valve opening operation of the cycle, and in Figs. 5 to 8 the successive relative positions of the rock shaft crank pins 67 and 65 are respectively shown as assumed during the same period in the cycle in which the inlet valve moves from its closed to its fully opened, and back to its closed position,—it being understood that after the inlet valve has come to its closed positions it there dwells during the time the exhaust valve is opened and until such valve is returned to its seat.

As the engine is organized, there are three eccentrics 85 distributed along the length of the engine shaft 7, with three sets of the connections including the eccentric straps and rods 85, 83, oscillating lever bars 87, and connecting rods 90 jointed to the crank arms or short levers 92 of rock shaft 63. One rock shaft 63 extends over the third motor cylinder, 3, and the air compressing cylinder 4, and has the two pairs of crank pins 65 and 67 coöperating with the cross head appliances of the two pairs of inlet and exhaust valve stems for the motor cylinder 3 and the air compressor cylinder 4. And it is here mentioned that the valve mechanism of the air compressor may be in many respects like that of the working cylinders, although certain differences in specific constructions, represented in Fig. 15, pertaining to the air compressor improvements not considered a part of this invention, are not claimed herein. The left hand set of each eccentric operated connections pertains to the valve operating mechanism for the left hand working cylinder 1, while the middle set of these eccentric actuated connections pertains to the valve operating mechanism of motor cylinder 2.

As will be seen on reference to Figs. 23 and 24, the oscillating bar or lever 87 has the intermediate pivot or trunnion, on which it rocks, extended at one side only, so that the slide block 89 may be moved lengthwise of the oscillatory bar 87 to either side of the center of oscillation.

97, Figs. 2, 23 and 24, represents what is herein termed a tumbling shaft, the same having three arms 98, to which the links 99 are connected and which also connect with the slide blocks 89 of the three sets of eccentric actuated connections for the aforementioned valve mechanisms. By imparting a rocking motion to the tumbler shaft, which may be done through a wrench or lever at one end of the motor, all of the slide blocks 89 may be shifted from the position shown in full lines in Fig. 23 to the extreme opposite position shown in dotted lines in said figures or in positions intermediate thereof. And the positioning of the slide blocks are all simultaneously uniformly more or less from the centers 88 of oscillation of the lever bars 87, and controls the extent of "throw" or thrust of the rock shaft cranks 65 and 67, and consequently controls the extent of opening and closing movements of the inlet and exhaust valves of the several cylinders, so that the access of motive power fluids into the cylinder may be varied in accordance with the efficiency demanded, at any given time, of the motor; and again it will be manifest that assuming the engine is running with its shaft 7 rotating in a given direction, by moving the slide blocks 89 to an opposite position relatively to the centers 88, on the lever bars 87, (as may be instantly done by imparting a partial rotary motion to the tumbler shaft 97) the continued successions and alternations as theretofore, of the openings and closings of the inlet and exhaust valves of the cylinders will be instantly reversed, resulting in an immediate reversal of the strokes of the cylinder piston and the rotation of the engine shaft.

The oil pump 43, shown in the drawings, includes the two pumping plungers 102 engaged with which is the intermediately pivoted rocker bar 103 on the rocker shaft 101; and with said rocker bar, one end of a link 104 has connection, such link also connecting with a block 105 slidable along the oscillatory lever bar 106, pivotally mounted at 107, and the rod 108 formed as one of the eccentric straps 109 connects with the lever bar 106, the said strap 109 encircling an eccentric 110 upon the short stud shaft 112; and on said shaft 112 is a gear wheel 113, which is driven through speed reducing gearing 114 between the gear wheel 113 and the engine shaft. The slide block 105 has a link 114' connected therewith, with which is also connected the bell crank 115, and to one arm of this bell crank lever a link is connected which also has connection with a lever arm 117, which is affixed to and is to be considered as an angular extension of, the lever 118 pivoted at 119 at the elbow. With this lever 118 the connecting rod 120 has engagement, said rod being also connected to the piston or diaphragm in the casing 48. The lever 118, which is comparatively long and more or less nearly horizontal, and has the free extremity slotted, embraces and moves relatively to an approximately vertical rod having an encircling spiral spring 123 against which the lever 118 swings in a downward direction, and which spring in reacting forces the lever 118 in an upward direction, and normally to assume the position represented by the broken line 124 in Fig. 16. The air pressure developed by the air compressor, and delivered into the distributing chamber 26 is correspondingly established in the casing 48, above the diaphragm or piston and causes a down swinging, more or less according to the pressure of the lever 118, which, through the angular lever extension 117, link 116, bell crank 115, and link 114, moves the slide block 105 to a point correspondingly far from the center 107 of oscillation of the lever bar 106, assuring correspondingly long pumping strokes of the pump plungers 102 for the pumping of a correspondingly considerable quantity of oil to the working cylinders, and thus automatically maintaining the liquid fuel feed proportionate in quantity to the pressure and corresponding quantity of compressed air to be mixed with the fuel and supply into the cylinders. A lowering of the pressure in the regulator casing 48 insures a reversal of the movement of the last described connections because of the reaction of the spring 123, and so there is also automatically assured, on any lowering in pressure of the air supply from the compressor for a lessened supply into the cylinders a correspondingly lessened liquid fuel ingress thereto.

The heater 24 may have a relief valve 130 therefor so that the compressed air therein subjected to heat may blow off at any predetermined pressure maximum, and the action of the engine may be controlled furthermore by the provision of the valve 132 shown in Fig. 20 and the pipe connecting the compressed air heater with the distributing chamber 26.

The combined heater and muffler shown in Figs. 21 and 22 may be one of many specific forms and constructions, having the capability of receiving the compressed air in a chamber therein separate from the chambers or passages through which the exhausting products of combustion pass. As here shown, the heater is made of cylindrical form having end heads 133 and partitions 35 dividing the chambers 135 for the motor exhaust from the intermediate chamber in and through which the compressed air is passed. The partitions 35, 35, have the flue connected openings distributed about the central portion of said partitions with which central portions the conduits 33 and 37 for the ingress and egress of the motor exhaust are in axial alinement, so that the exhausting dead gas entering with more or less pressure into one end of the drum 24 will strike the imperforate middle portion of the one end partition, and thereby be deflected or distributed outwardly so as to pass through the multiplicity of flues not only for heat distribution, but also for the diminution of the pressure and noise producing capability.

As represented in Fig. 20, the pipe 140 coupling connected with the pipe 42 leading from the petroleum supply receptacle 40 to the pump 43,—such pipe having also connection with the auxiliary receptacle 142 for containing gasolene.

143 represents a cock in the pipe 42 between the petroleum receptacle 40 and the junction with said pipe 42 of the pipe 140 leading from the auxiliary receptacle, and the cock 144 is provided in the said pipe 140 between the receptacle 142 and pipe 42, all to the end that the pump may be in connection with either the petroleum supply or the gasolene supply, and at one time with only one thereof.

The engine may be most expeditiously started by closing the cock 143 and opening the cock 142, giving initially a gasolene ingress into the working cylinders for admixture with the compressed air, the ignition being in the working cylinders of this motor by any of the improved means, such as a spark or incandescent plug or pilot light in each cylinder. So soon as the motor is well under way, the auxiliary, gasolene, supply is shut off, and the petroleum supply is open to connect with the pump for the indefinitely continued delivery to the cylinders of the hydrocarbon relied on as the motive power fluid. The combustion of the combined oil and air begins with the opening of the cylinder inlet 12 and continues, at substantially uniform pressure, during the entire working stroke of the piston,—the volume of the motive power fluid, however, increasing as the piston recedes; and this engine may be constructed so that the piston has a position at the commencement of this working movement within a small fraction of an inch of the inner end wall or valve plate of the cylinder. And while this motor is principally intended, and as shown is designed as an internal combustion motor, as distinguished from explosive gas engines, this invention is comprised in an apparatus which in some respects has adaptability for employment as an explosive engine. And while the motor is shown as having three working cylinders in uniform arrangement, together with an air compressing cylinder of the same size as the working cylinder, the number of working cylinders may be increased or lessened, and the size of the air compressor relative to the working cylinder or cylinders may be altered; but it is expected that the motor will be constructed with the inclusion of an air compressor for producing and delivering compressed air into the working cylinders at a pressure as great as, or greater than, the pressure developed by the piston in any one of the working cylinders; and it is not essential under all aspects of this invention that the air compressor be operated by and from the power developed by the motor,—it being possible to operate the air compressor having the air supplying connections with the motor as described independently; and yet some degree of invention is involved in the inclusion of the air compressor and its actuating means substantially as shown in conjunction with the valve actuating mechanism for one of the working cylinders.

Having thus described my invention, what I claim and desire to secure by Letters Patent is:—

1. In a motor, in combination, an air compressor, a working cylinder having a piston therein, and having inlet and outlet openings, and admission and exhaust valves therefor, and said cylinder comprising an annular oil chamber surrounding the said inlet opening, and having an annular slit connecting it with the inlet opening, means for supplying liquid fuel to said annular chamber, a conduit for compressed air leading from the air compressor to said inlet opening, a heater with which said conduit is connected and through which the compressed air to the cylinder inlet is conveyed, and a conduit connected with the said exhaust opening and with said heater.

2. In an internal combustion motor, in combination, one or more working cylinders and an inclosing casing therefor, containing an engine submerging liquid, a receptacle for a liquid fuel supply, and a conduit leading from said receptacle to connections into the cylinders, a portion of which conduit is inclosed within said casing, and subjected to the heating action of the cylinder enveloping liquid therein.

3. In a motor of the character described, in combination, a plurality of motor cylinders, each having a liquid fuel, inlet, and an exhaust opening, an oil distributing pipe having branch connections with the cylinder inlet openings, and an air distributing chamber having branch connections with said cylinder inlet openings, an oil supply receptacle and a pump for delivering oil therefrom through said oil distributing pipe, an air compressor, a heater into which the compressed air is delivered therefrom, a conduit in communication with the cylinder exhaust openings and with said heater, a conduit leading from the heater to the said air distributing chamber, pistons in the cylinders, an engine shaft, connected with the pistons, and having actuating connection with the air compressor, valves for the cylinder inlet and exhaust openings, and mechanism, operated from the engine shaft for actuating said valves.

4. In a motor of the character described, in combination, a plurality of motor cylinders, each having a liquid fuel, inlet, and an exhaust, opening, an oil distributing pipe having branch connections with the cylinder inlet openings, and an air distributing chamber having branch connections with said cylinder inlet openings, an oil supply receptacle and a pump for delivering oil therefrom through said oil distributing pipe, an air compressor, a heater into which the compressed air is delivered therefrom, a conduit in communication with the cylinder exhaust openings and with said heater, a conduit leading from the heater to the said air distributing chamber, having a throttling valve therein, pistons in the cylinders, an engine shaft, connected with the pistons, and having actuating connection with the air compressor, valves for the cylinder inlet and exhaust openings, and mechanism, operated from the engine shaft for actuating said valves.

5. In a motor of the character described, in combination, a plurality of motor cylinders, each having a liquid fuel inlet, and an exhaust opening, an oil distributing pipe having branch connections with the cylinder inlet openings, and an air distributing chamber having branch connections with said cylinder inlet openings, an oil supply receptacle and a pump for delivering oil therefrom through said oil distributing pipe, an air compressor, a heater into which the compressed air is delivered therefrom, a conduit in communication with the cylinder exhaust openings and with said heater, a conduit leading from the heater to the said distributing chamber, having a throttling valve therein, pistons in the cylinders, an engine shaft, connected with the pistons, and having actuating connection with the air compressor, valves for the cylinder inlet and exhaust openings, mechanism, operated from the engine shaft, for actuating said valves, and comprising cranked rock shafts coöperating for alternating actions with the respective pairs of valves, intermediately pivoted oscillatory bars, eccentrics on the engine shaft and eccentric rods connected with said bars, slides on said bars, connections between the slides and said rock shafts, and means for positioning said slides on said bars.

6. In an internal combustion motor, in combination one or more working cylinders and an air compressor, and a conduit connected therewith for supplying air to said cylinders, a liquid fuel supply and a pump for forcing oil from said supply to the cylinder, movable mechanism for actuating said oil pump, pistons in the cylinders and the motor shaft in driving connection therewith, a regulator comprising a movable member subject to the air pressure developed by the air compressor, a pivotally mounted bar and connections between it and the motor shaft, the slide block on said bar, and connections between the latter and the oil pump actuating mechanism, an angle lever, subject to swinging movement by said movable, regulator, member, and connections between said lever and said slidable block.

7. In an internal combustion motor, in combination, one or more working cylinders and an air compressor, and a conduit connected therewith for supplying air to said cylinders, a liquid fuel supply and a pump for forcing oil from said supply to the cylinder, movable mechanism for actuating said oil pump, pistons in the cylinders and the motor shaft in driving connection therewith, a regulator comprising a movable member, subject to the air pressure developed by the air compressor, a pivotally mounted bar and connections between it and the motor shaft, the slide block on said bar, and connections between the latter and the oil pump actuating mechanism, an angle lever, subject to swinging movement by said movable, regulator, member, connections between said lever and said slidable block, and a reacting spring device, against which said angle lever moves in one direction, and operable to reverse the movements of the connections both between the said angle lever and the regulator member and between said lever and the slidable block.

8. In a motor of the character described, the combination with the engine shaft, working cylinders having inlet and exhaust openings, and cylinder pistons connected with the engine shaft, of an air compressor having connection with the cylinder inlet openings, an oil supply receptacle, a pump in connection therewith and with the cylinder inlet opening, and having movable actuating mechanism, a bar pivotally mounted and connections between the engine shaft and said bar for oscillating the latter, a block slidable on said bar, connections between said block and the said oil pump actuating mechanism, for actuating the latter in consequence of the oscillation of said block on said bar, a regulator having a movable member subject to the pressure of the compressed air in delivery to the cylinders, the united and angularly arranged lever members 118,— in engagement with the movable regulator member,—and 117, the bell crank lever 115, the link 116 connecting lever member with said bell crank, the link 114' connecting the bell crank with said slidable block, and the rod 122, having the spring encircling it and with which spring the extremity of the lever member 118 engages, and said rod having the adjustable abutment $122^2$, between which and said lever member 118 said spring is in compression.

9. In an internal combustion motor, the combination with one or more working cylinders, and an air compressor having connection with the valved inlet openings therein, of a receptacle for petroleum or like hydrocarbon fuel, an auxiliary receptacle for a more volatile liquid fuel, a conduit connected with the inlet openings of the cylinders, and in connection with both said receptacles, and cocks pertaining to said respective receptacles operable to maintain one of the latter in connection with said conduit, and the other closed from such connection, and vice versa.

10. In an internal combustion motor, the combination with one or more working cylinders, cylinder pistons, and the motor shaft, and an air compressor having connection with the valved inlet openings therein, of a receptacle for petroleum or like hydrocarbon fuel, an auxiliary receptacle for a more volatile liquid fuel, a conduit connected with the inlet openings of the cylinders, an oil pump connected with said conduit and having pumping connection with both said receptacles, and cocks pertaining to said respective receptacles operable to maintain one of the latter in connection with said pump, and the other closed from such connection, and vice versa, and mechanism between the motor shaft and said oil pump for actuating the latter.

11. In a motor of the character described, the combination with one or more working cylinders, having valved liquid-fuel and compressed-air inlet-openings, and exhaust-openings, and means for supplying liquid fuel to said inlet openings, of an air compressor, a casing comprising an intermediate air receiving chamber and opposite end chambers 135, 135, with the partition 35 separating them from said intermediate chamber, flues connecting said opposite end chambers, a conduit leading from the air compressor into said air-receiving chamber, and a conduit leading from such chamber to communication with the inlet-openings of the cylinders, a conduit having branch connections with the exhaust openings of the cylinders and connected with one of the end chambers 135, and a discharge passage leading from the other end chamber, for the purposes set forth.

Signed by me at Springfield, Mass., in presence of two subscribing witnesses.

CHARLES HENRY ATKINS.

Witnesses:
WM. S. BELLOWS,
G. R. DRISCOLL.